(12) United States Patent
Hasaka

(10) Patent No.: US 6,607,828 B1
(45) Date of Patent: Aug. 19, 2003

(54) METHOD OF BONDING AN ETHYLENE-α-OLEFIN RUBBER COMPOSITION TO A FIBER CORD AND A FIBER CORD-RUBBER LAMINATE MADE ACCORDING TO THE METHOD

(75) Inventor: Hitoshi Hasaka, Kobe (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/461,601

(22) Filed: Dec. 15, 1999

(30) Foreign Application Priority Data

Dec. 16, 1998 (JP) .......................... 10-357718

(51) Int. Cl.[7] .................. B32B 25/02; B32B 27/02; B32B 31/12; D02G 3/44; D02G 3/48
(52) U.S. Cl. .................. 428/369; 156/315; 156/910; 428/375; 428/395
(58) Field of Search .................. 156/315, 910; 428/369, 395, 375

(56) References Cited

U.S. PATENT DOCUMENTS

| | | | | |
|---|---|---|---|---|
| 3,090,716 A | * | 5/1963 | Stevens .................. | 156/910 |
| 3,775,158 A | * | 11/1973 | Gallagher et al. .......... | 156/315 |
| 4,248,938 A | * | 2/1981 | Takata et al. ............... | 156/910 |
| 5,080,159 A | * | 1/1992 | Komai et al. ............... | 156/910 |
| 5,306,369 A | * | 4/1994 | Fujiwara et al. ............ | 156/315 |

FOREIGN PATENT DOCUMENTS

| | | | | |
|---|---|---|---|---|
| JP | 1-153777 | * | 6/1989 | ................. 156/332 |
| JP | A-339843/1992 | | 11/1992 | |
| WO | WO96/13544 | | 5/1996 | |

* cited by examiner

Primary Examiner—Adrienne C. Johnstone
(74) Attorney, Agent, or Firm—Wood, Phillips, Katz, Clark & Mortimer

(57) ABSTRACT

A method of bonding an ethylene.α-olefin rubber composition to a fiber cord. The method includes the steps of: treating a fiber cord with a first treating solution that is at least one of an isocyanate compound and an epoxy compound; after treating the fiber cord with the first treating solution, treating the fiber cord with a second treating solution including resorcinol-formalin-rubber latex; after treating the fiber cord with the second treating solution, treating the fiber cord with a third treating solution including a halogenated polymer and a vulcanizing agent; and after treating the fiber cord with the third treating solution, vulcanization-bonding an unvulcanized ethylene.α-olefin rubber composition to the fiber cord.

28 Claims, 2 Drawing Sheets

METHOD OF BONDING AN ETHYLENE-α-OLEFIN RUBBER COMPOSITION TO A FIBER CORD AND A FIBER CORD-RUBBER LAMINATE MADE ACCORDING TO THE METHOD

BACKGROUND OF THE INVENTION

1. Field of the Invention

This invention relates to fiber cords, as used as load carrying members in power transmission belts, and, more particularly, to a method of bonding an ethylene.α-olefin rubber composition to such a fiber cord.

2. Background Art

In response to the demand for energy savings, automobiles have been made increasingly more compact. Engine compartments have likewise been compacted. With engines running at high temperatures, the engine components, including power transmission belts in the engine compartment, are required to perform at high temperatures.

Natural rubber, styrene-butadiene rubber, and chloroprene rubber have been widely used to construct power transmission belts. However, these rubbers tend to crack prematurely in high temperature environments in which they are operated. This cracking is typically a problem in the compression rubber section of the belt.

Research has been carried out to improve the heat resistance of chloroprene rubber to address the problem of premature failure. Alternatives to the above rubbers have been proposed. For example, in Japanese Unexamined Patent Publication No. 6-345948, it is suggested that ethylene-α-olefin elastomers, such as ethylene-propylene rubber (EPR), ethylene-propylene-diene rubber (EPDM), and the like, be used for power transmission belts because of the high resistance to heat and cold, and also because these rubbers are relatively inexpensive.

However, ethylene-propylene rubber has a relatively low tear strength, and may have an even lower tear strength in a peroxide vulcanization system. As a result, load carrying cords in the belt may break away during use.

A sulfur vulcanization system generally makes it difficult to achieve a sufficient degree of vulcanization, as a result of which the belt may become excessively worn during operation. This is particularly true of a V-ribbed belt. With this type of belt, wear dust commonly accumulates between ribs, at the base thereof. Eventually, this may cause tack wear which produces problematic noise.

To increase the degree of vulcanization, it is known to use EPDM, with a very large number of double bonds, to alleviate tack wear to a certain extent. However, this may result in a reduction in heat resistance.

There has also been a problem in effectively bonding ethylene-α-olefin elastomer to a fiber cord. It is known to immerse a fiber material in a dipping solution of resorcinol-styrene-butadiene-vinyl pyridine latex, followed by vulcanization-bonding of an EPDM rubber composition to the fiber material. This is disclosed, for example, in Japanese Unexamined Patent Publication No.8-113657. In Japanese Unexamined Patent Publication No.8-113656, a method is disclosed in which fiber material is treated in a bonding solution of resorcinol-formalin-rubber latex after which vulcanization-bonding is carried out with an EPDM rubber composition having a methylene donor, a methylene acceptor, and a silicic compound.

While treatment with a solution of resorcinol-styrene-butadiene-vinyl pyridine latex improves bonding strength, when such fibers are used as load carrying cords in a power transmission belt which is subjected to repetitive flexing, the load carrying cords may prematurely release from the rubber in which they are embedded.

Even when a fiber material is treated with an EPDM rubber composition having a methylene donor, a methylene acceptor, and a silicic compound, such fiber, when used as a load carrying cord in a power transmission belt, that is subjected to repetitive flexing, may also prematurely release from the rubber in which it is embedded.

SUMMARY OF THE INVENTION

In one form, the invention is directed to a method of bonding an ethylene.α-olefin rubber composition to a fiber cord. The method includes the steps of: treating a fiber cord with a first treating solution that is at least one of an isocyanate compound and an epoxy compound; after treating the fiber cord with the first treating solution, treating the fiber cord with a second treating solution including resorcinol-formalin-rubber latex; after treating the fiber cord with the second treating solution, treating the fiber cord with a third treating solution including a halogenated polymer and a vulcanizing agent; and after treating the fiber cord with the third treating solution, vulcanization-bonding an unvulcanized ethylene.α-olefin rubber composition to the fiber cord.

The third treating solution may include a bonding rubber.

The halogenated polymer and bonding rubber in the third treating solution may be present in a ratio of 3:7 to 7:3.

In one form, the fiber cord has a solid pickup of a bonding agent in the range of 3–16% by weight at the completion of bonding, with the bonding agent made up of the halogenated polymer in the third treating solution.

The bonding rubber may be an ethylene.α-olefin rubber.

In one form, the ethylene.α-olefin rubber is at least one of a) EPDM rubber derivable from an ethylene-propylene-diene monomer and b) EPR rubber.

The cord may be a cord of twisted fiber that is at least one of aramid fiber and polyester fiber.

The isocyanate compound may be at least one of 4,4'-diphenylmethane diisocyanate, tolylene 2,4-diisocyanate, polymethylene polyphenyl diisocyanate, hexamethylene diisocyanate, polyaryl polyisocyanate, and the like.

The isocyanate compound may be mixed with at least one of an organic solvent and an organic solvent that is at least one of toluene and methyl ethyl ketone.

The method may further include the step of reacting the isocyanate compound with a blocking agent to produce a polyisocyanate with a blocked isocyanate group.

The epoxy compound may be at least one of a) a polyhydric alcohol, b) a product obtained by the reaction of a polyalkylene glycol with a halogen-containing epoxy compound, and c) a product obtained by the reaction of a polyhydric phenol with a halogen-containing epoxy compound.

The step of treating the fiber with a first treating solution may involve immersing the fiber cord in the first treating solution for 0.5–30 seconds and then drying the fiber cord for 2–5 minutes at 150–190° C.

The resorcinol-formalin-rubber latex of the second solution may be a mixture of a resorcinol-formalin polycondensate and a rubber latex, with the resorcinol to formalin molar ratio being in the range of 3:1 to 1:3.

The rubber latex may be at least one of an acrylonitrile-butadiene rubber latex (NBR latex) and a hydrogenated acrylonitrile-butadiene rubber latex (H-NBR latex).

The resorcinol-formalin polycondensate may have a resin content of 5–100 parts by weight per 100 parts by weight of rubber latex, with the total solid content of the resorcinol-formalin-polycondensate being between 5–40%.

The step of treating the cord with the second treating solution may involve immersing the fiber cord in the second treating solution at a temperature of 5–40° C. for 0.5–30 seconds, and then drying the fiber cord for 1–3 minutes at 200–250° C.

The halogenated polymer of the third treating solution may be at least one of chlorinated rubber, chloroprene rubber, and chlorosulfonated polyethylene rubber.

The bonding rubber may be at least one of ethylene.α-olefin rubber, NBR, SBR, and ethylene.α-olefin rubber that is at least one of EPDM and EPT.

The vulcanizing agent may be at least one of dibenzothiazil disulfide (MBTS), tetramethylthiuram disulfide (TMTD), N-cyclohexyl-2-benzothiazil sulfenamide (CBS), tetramethylthiuram monosulfide (TMTM), mercapto-benzothiazole (MBT), PZ (ZnMDC), and sulfur.

The invention is further directed to a method of bonding an ethylene.α-olefin rubber composition to a fiber cord. The method includes the steps of: treating a fiber cord with a first treating solution including at least one of an isocyanate compound and an epoxy compound; after treating the fiber cord with the first treating solution, treating the fiber cord with a second treating solution including resorcinol-formalin-rubber latex, with the rubber latex including at least an acrylonitrile-butadiene rubber latex; after treating the fiber cord with the second treating solution, treating the fiber cord with a third treating solution including a chlorinated rubber, an ethylene.α-olefin rubber, and a vulcanizing agent, with the ratio of chlorinated rubber to ethylene.α-olefin rubber being 3:7 to 7:3, and so that the fiber cord has a solid pickup of a bonding agent in the range of 3–16% by weight at the completion of bonding, with the bonding agent including rubber contained in the third treating solution; and after treating the fiber cord with the third treating solution, vulcanization-bonding an unvulcanized ethylene.α-olefin rubber composition to the fiber cord.

The invention is further directed to a fiber cord-rubber laminate made according to the process described above.

DETAILED DESCRIPTION OF THE DRAWINGS

Figure 1:
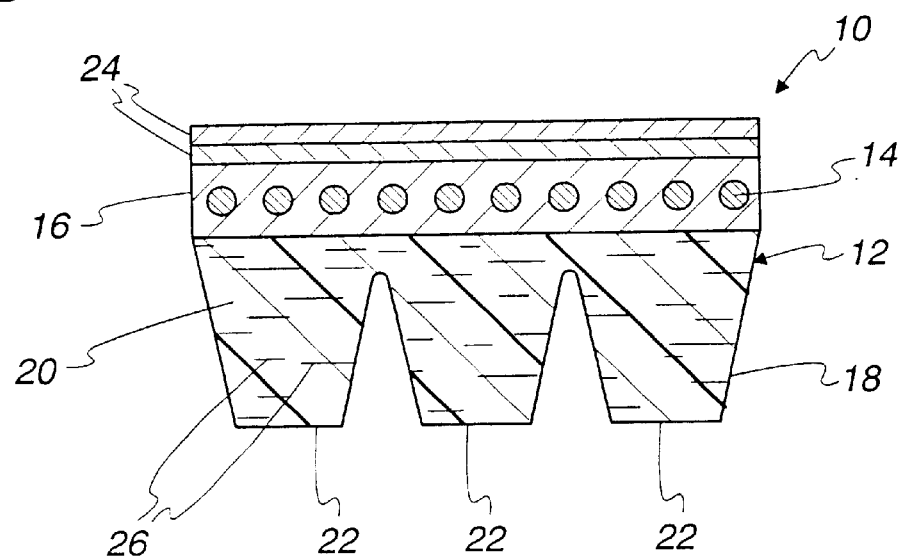
FIG. 1 is a cross-sectional view of a V-ribbed belt having fiber load carrying cords with ethylene.α-olefin rubber composition bonded thereto, according to the present invention.

Referring initially to FIG. 1, one form of power transmission belt, with which the present invention can be practiced, is shown at 10. The belt 10 is a V-ribbed belt having a body 12 within which load carrying cords 14 are embedded. Fiber yarns are twisted into high strength, low elongation, cords 14. The cords 14 are embedded in a cushion rubber layer 16 and define the belt neutral plane. Inside of the neutral plane is the belt compression section 18. The compression section 18 is defined in part by a rubber layer 20, bonded to the cushion rubber layer 16. The rubber layer 20 has individual, laterally spaced, ribs 22 formed therein. The ribs 22 extend lengthwise of the belt 10. Two rubberized canvas layers 24 are applied to the outside of the cushion rubber layer 16.

The rubber of the layer 20 may contain short, reinforcing fibers 26 which extend generally in a lateral direction with respect to the belt body 12. The fibers 26 may be at least one of aramid, nylon, polyester, vinylon, and cotton, preferably in an amount of 1–50 parts by weight, and more preferably 5–25 parts by weight. The rubber in the cushion rubber layer 16 is preferably made from an ethylene-α-olefin elastomer which is resistant to heat, firmly bondable to the load carrying cords 14, and readily vulcanizable with sulfur. If necessary, reinforcement such as carbon black and silica, filler such as calcium carbonate and talc, plasticizers, stabilizers, processing aids, and colorants, commonly used in rubber compositions, may be employed.

The amount of sulfur used in the cushion rubber layer 16 is preferably in the range of 0.5 to 3.0 parts by weight per 100 parts by weight of the ethylene-α-olefin elastomer that is used.

Of the ethylene-α-olefin elastomers used in the cushion rubber layer 16, EPDM should have an iodine value of more than 4 but less than 40. Iodine values of less than 4 may insufficiently vulcanize the EPDM rubber composition, as a consequence of which the load carrying cords 14 may pop out in use. On the other hand, iodine values in excess of 40 may be responsible for shortened scorching of the rubber composition, resulting potentially in inconvenient handling and poor heat resistance.

Figure 2:
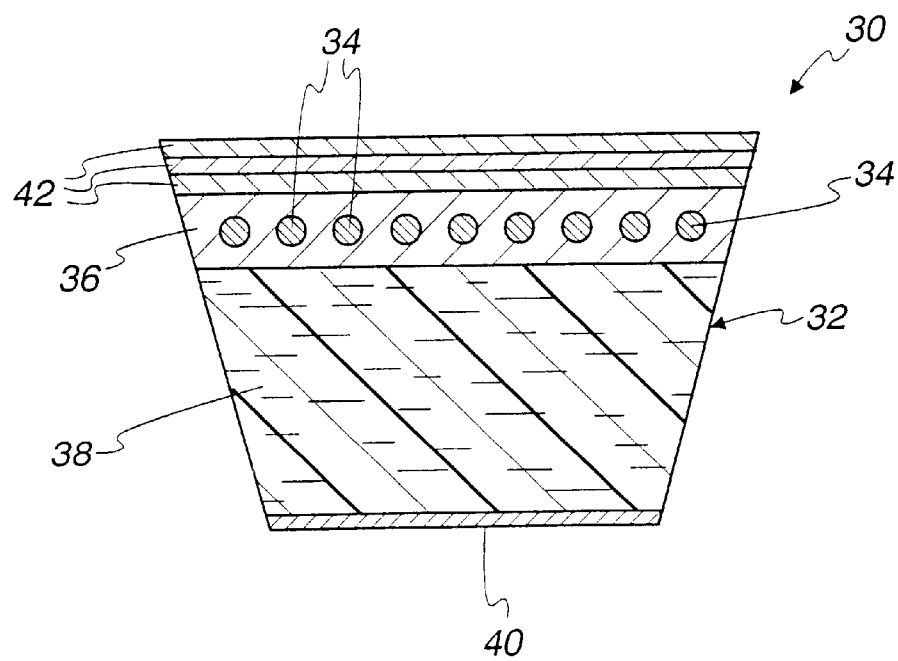
FIG. 2 is a cross-sectional view of a V-belt having fiber load carrying cords with ethylene.α-olefin rubber composition bonded thereto, according to the present invention.

The invention can also be practiced on a V-belt, as shown at 30 in FIG. 2. The V-belt 30 has a body 32 with load carrying cords 34 embedded in a cushion rubber layer 36. A rubber layer 38 in the compression section of the belt 30 is adhered to the inside of the cushion rubber layer 36. A single layer 40 of rubberized fabric is applied to the inside of the rubber layer 38. Three such layers 42 are applied to the outside of the cushion rubber layer 36. Optional cogs (not shown) may be formed along the length of the belt body 32 at regular, desired intervals.

The present invention is concerned with the bonding of ethylene.α-olefin rubber to cords such as the load carrying cords 14, 34 in the belts 10, 30. It should be understood that the invention can be practiced incorporating the fibers elsewhere into the belts and into belts having a different configuration than those shown.

The ethylene.α-olefin rubber composition suitable for the present invention may be EPDM rubber derivable from an ethylene-propylene-diene monomer. Examples of diene monomers are dicyclopentadiene, methylene norbornene, ethylidene norbornene, 1,4-hexadiene, cyclooctadiene, and the like. Ethylene-propylene rubber (EPR) can also be used.

To vulcanize these rubbers, sulfur or an organic peroxide may be used. The organic peroxide may be at least one of dicumyl, peroxide, di-t-butyl peroxide, t-butylcumyl peroxide, benzoyl peroxide; 1,3-bis(t-butylperoxyisopropyl) benzene, 2,5-dimethyl-2,5-di(t-butylperoxy)hexene-3,2,5-dimethyl-2,5-(benzoylperoxy) hexane,2,5-dimethyl-2,5-mono(t-butylperoxy)hexane, and the like. These organic peroxides may be used alone or in combination, and preferably are present in an amount of 0.005 to 0.02 g by mol based on 100 g of an ethylene-α-olefin elastomer.

Vulcanizing co-agents may be added to enhance the degree of vulcanization, to avoid tack wear problems. The vulcanization co-agents may be at least one of TIAC, TAC, 1,2-polybutadiene, metallic salts of unsaturated carboxylic acids, oximes, guanidine, trimethylolpropane trimethacrylate, ethylene glycol dimethacrylate, N-N'-m-phenylene bismaleimide, sulfur, and the like. All of these are commonly used in peroxide vulcanization.

Other additives may be used, as desired. For example, reinforcements such as carbon black and silica, fillers such as calcium carbonate and talc, plasticizers, stabilizers, processing aids, and colorants, conventionally used in rubber compositions, may be employed.

The fibers used to make the cords 14 may be at least one of aramid fiber or polyester fiber. The polyester fiber may be, for example, polyethylene terephthalate fiber (PET fiber) or polyethylene naphthalate fiber (PEN fiber).

The individual cords 14, 34 made from the twisted yarn may be treated as follows.

Treatment Step No. 1

Untreated cords of twisted yarn are immersed for 0.5 to 30 seconds in a first treating solution made up of at least an isocyanate compound and/or an epoxy resin, after which they are set at room temperature, and then dried by passage through an oven at 150–190° C. for 2–5 minutes.

The isocyanate compound is selected from among 4,4'-diphenylmethane diisocyanate, tolylene 2,4-diisocyanate, polymethylene polyphenyl diisocyanate, hexamethylene diisocyanate, polyaryl polyisocyanate (one commercially available product is sold currently under the trademark PAPI™), and the like. The isocyanate group may be mixed with an organic solvent such as toluene, methyl ethyl ketone, or the like.

It may also be desirable to use a blocked polyisocyanate. This is derived by reacting the above isocyanate compound with a blocking agent such as phenol, a tertiary alcohol, a secondary alcohol, or the like, so that the isocyanate group is blocked in the resulting polyisocyanate.

The epoxy compound may be selected from among a) polyhydric alcohols such as ethylene glycol, glycerin, pentaerythritol, and the like, b) products obtained by reaction of polyalkylene glycols such as polyethylene glycol, and the like, with halogen-containing epoxy compounds such as epichlorohydrin, and c) products obtained by reaction of polyhydric phenols such as resorcinol, bis(4-hydroxyphenyl)dimethylmetane, phenolformaldehyde resin, resorcineformaldehyde resin, and the like, with halogen-containing epoxy compounds. The epoxy compound may be mixed with an organic solvent such as toluene, methyl ethyl ketone, or the like.

Treatment Step No. 2

After treatment step No. 1, the load carrying cord 14, 34 is treated with a second solution, that is an RFL solution. The RFL solution may be a mixture of resorcinol-formalin-polycondensate and a rubber latex. The resorcinol to formalin molar ratio is preferably 3:1 to 1:3 to obtain good bonding strength. Preferably, the rubber latex is at least one of an acrylonitrile-butadiene rubber latex (NBR latex) and a hydrogenated acrylonitrile-butadiene rubber latex (H-NBR latex) for good bond strength.

The resorcinol-formalin polycondensate is mixed to have a resin content of 5–100 parts by weight based on 100 parts by weight of the rubber latex, in terms of rubber content. The total solid content of the polycondensate is adjusted to 5–40%.

The second treating solution is maintained at 5–40° C. during immersion of the fiber cords 14, 34. The cords 14, 34 are immersed for 0.5–30 seconds. The cords 14, 34 are then heated, as in an oven maintained at 200–250° C., for 1–3 minutes.

Treatment Step No. 3

The third treating solution is made by adding a vulcanizing agent to a halogenated polymer. Another bonding rubber may be added to the halogenated polymer and the vulcanizing agent. The halogenated polymer may be at least one of chlorinated rubber, chloroprene rubber, and chlorosulfonated polyethylene rubber.

The bonding rubber is preferably different than the halogenated polymer. Suitable examples of the bonding rubber are ethylene.α-olefin rubber, NBR, SBR, and the like. If ethylene.α-olefin rubber is used, preferably it is an EPDM or EPT rubber.

The vulcanizing agent may be at least one of dibenzothiazil disulfide (MBTS), tetramethylthiu ram disulfide (TMTD), N-cyclohexyl-2-benzothiazil sulfenamide (CBS), tetramethylthiuram monosulfide (TMTM), mercaptobenzothiazole (MBT), PZ (ZnMDC), and sulfur. By means of vulcanization bonding at 140–180° C., the vulcanizing agent improves the bond strength between the fiber cord 14, 34 and the ethylene.α-olefin rubber composition that is used.

In the event that a bonding rubber other than the halogenated polymer is added to the third treating solution, the ratio of halogenated polymer to bonding rubber is preferably 3:7 to 7:3. The ratio within this range contributes to bond strength.

Additionally, the fiber cord 14, 34 has a solid pickup of a bonding agent in the range of 3–16% by weight at the completion of bonding. This renders the cords 14, 34 less susceptible to residues as might detract from appearance. This also prevents the cord from becoming overridden or diverged during cord spinning as the belt is being formed.

One exemplary process will now be described for the formation of the belt 10 using the inventive treated cords/fiber cord-rubber laminates.

The rubberized canvas layers 24 and cushion rubber layer 16 are applied to a forming drum. The load carrying cords 14 are spirally wrapped thereover. The rubber layer 20 is then applied to the cushion rubber layer 16. A laminate sleeve subassembly is thus obtained which is vulcanized with the use of sulfur or an organic peroxide.

The vulcanized sleeve is then trained around driving rollers and driven rollers and is driven at a preselected speed under a predetermined tension. As this occurs, a rotating grinding wheel is pressed against the belt sleeve. 3–100 recesses are ground through the exposed surface of the rubber layer 20 on the vulcanized sleeve to form the ribs 22.

At the completion of the rib formation, the sleeve is removed from the driving and driven rollers and trained around another set of driving and driven rollers and driven at a preselected speed. A cutter is then used to cut the belt sleeve to a predetermined width as dictated by the width desired for the belt 10.

Specific Examples

The present invention will now be described with respect to specific examples.

Cord Formation

A cord of twisted yarn made from polyethylene terephthalate, having an 1100 d/1×5 configuration, was prepared and immersed at a tension of 500 g in a first treating solution having the composition shown in Table 1, below.

TABLE 1

| Formulated Components | Parts |
| --- | --- |
| Polymeric isocyanate | 10 |
| Toluene | 90 |
| Total | 100 |

After being heated at 180° C. for 4 minutes, the cord was immersed in a second treating solution having the composition shown in Table 2, below, and then heated at 230° C. for two minutes.

TABLE 2

| Formulated Components | Parts |
|---|---|
| NBR latex (40%) | 100 |
| Resorcinol | 14.6 |
| 37% Formalin | 9.2 |
| Sodium hydroxide (10%) | 1.5 |
| Water | 262.5 |
| Total | 387.8 |

The cord was then immersed in a third treating solution having a composition shown in Table 3, below, and then heat treated at 100° C. for three minutes.

TABLE 3

| | Examples | | | | | | | | | | | Comparative Examples | | | |
|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 |
| Formulation | | | | | | | | | | | | | | | |
| Treating solution | A | B | C | D | E | I | J | K | L | M | N | F | G | H | 0 |
| Formulated components | | | | | | | | | | | | | | | |
| Chlorinated rubber | 1 | 3 | 5 | 8 | 12 | 1 | 3 | 5 | 7 | 9 | 10 | — | — | — | 10 |
| NBR rubber | — | — | — | — | — | — | — | — | — | — | — | 5 | — | — | — |
| SBR rubber | — | — | — | — | — | — | — | — | — | — | — | — | 5 | — | — |
| Bonding rubber | 1 | 3 | 5 | 8 | 12 | 9 | 7 | 5 | 3 | 1 | — | 5 | 5 | 10 | — |
| Sulfur | — | — | — | — | — | — | — | — | — | — | 0.1 | — | — | — | — |
| Toluene | 98 | 94 | 90 | 84 | 76 | 90 | 90 | 90 | 90 | 90 | 90 | 90 | 90 | 90 | 90 |
| Total | 100 | 100 | 100 | 100 | 100 | 100 | 100 | 100 | 100 | 100 | 100 | 100 | 100 | 100 | 100 |
| Pickup (%) | 1.1 | 4.2 | 7.2 | 13.5 | 19.4 | 8.0 | 7.9 | 7.2 | 7.6 | 7.3 | 7.2 | 8.1 | 7.7 | 8.1 | 7.5 |
| Bond strength [N/25 mm] | | | | | | | | | | | | | | | |
| Room temperature | 250 | >500 | >500 | >500 | 400 | 200 | 400 | >500 | 450 | 150 | 350 | 40 | 40 | 40 | 40 |
| 120° C. | 40 | 85 | 100 | 120 | 100 | 30 | 80 | 110 | 70 | 10 | 85 | 15 | 10 | 10 | 10 |
| Appearance | good | good | good | good | NG | good | good | good | good | good | good | good | good | good | good |

The cord was then incorporated into a power transmission belt as a load carrying cord-rubber laminate. The composition of the bonding rubber used is shown in Table 4, below.

TABLE 4

| Formulated Components | Parts |
|---|---|
| EPDM polymer | 100 |
| Zinc oxide | 5 |
| Stearic acid | 1 |
| Carbon black | 15 |
| Hydrated silicic acid | 30 |
| Resorcinol-formalin polycondensate | 2 |
| Accelerator (MBTS) | 1.5 |
| Sulfur | 2 |
| Hexamethoxymethylol melamine | 4 |
| Total | 100 |

The treating steps used are described in Table 5, below.

TABLE 5

| | Examples | Comparative Examples |
|---|---|---|
| | 1 2 3 4 5 6 7 8 9 10 11 | 1 2 3 4 |
| First treating step | | |
| Treating solution | Treating Solution 1 | |
| Treating conditions | 180° C. × 4 min. | |
| Second treating step | | |
| Treating solution | Treating solution 2 | |
| Treating conditions | 230° C. × 2 min. | |

TABLE 5-continued

|  | Examples | | | | | | | | | | | Comparative Examples | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 1 | 2 | 3 | 4 |
| Third treating step | | | | | | | | | | | | | | | |
| Treating solution | A | B | C | D | E | I | J | K | L | M | N | F | G | H | O |
| Treating conditions | | | | | | | 100° C. × 3 min. | | | | | | | | |

Analysis of Flat Peel Strength Characteristics

The treated cords were extended lengthwise and placed one against the other to produce an overall width of 25 mm. The cords were then laminated with an unvulcanized rubber having the composition shown in Table 6, below.

TABLE 6

| Formulated Components | Parts |
| --- | --- |
| EPDM polymer | 100 |
| Zinc oxide | 5 |
| Stearic acid | 1 |
| Carbon black | 35 |
| Hydrated silicic acid | 20 |
| Resorcinol-formalin polycondensate | 2 |
| Antioxidant | 2 |
| Accelerator | 1 |
| Accelerator CM | 1 |
| Hexamethoxymethylol melamine | 2 |
| Sulfur | 1 |
| Total | 170 |

Press vulcanization was carried out at 153° C. for 30 minutes and a T-type peeling test was performed at a speed of 50 mm/min.

Figure 3:
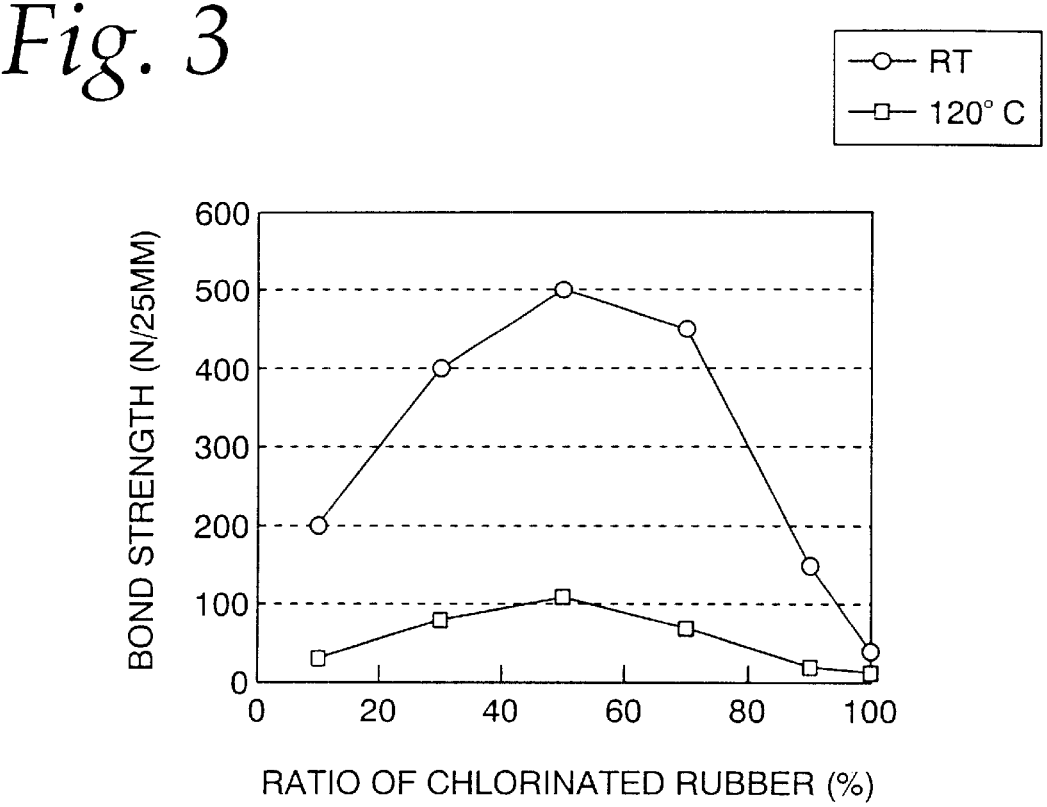
FIG. 3 is a graph showing the relationship between the ratio of a chlorinated rubber and bond strength.

In Table 3, the test results are shown which are related to the peel strength (bond strength) between the treated cord and the rubber in which it was embedded, measured both at room temperature and at an ambient temperature of 120° C. The appearance of the cord under the same conditions is also identified in Table 3. FIG. 3 also shows the relationship between the chlorinated rubber content and the bond strength.

Method of Measuring Pickup of Bonding Agent

Figure 4:
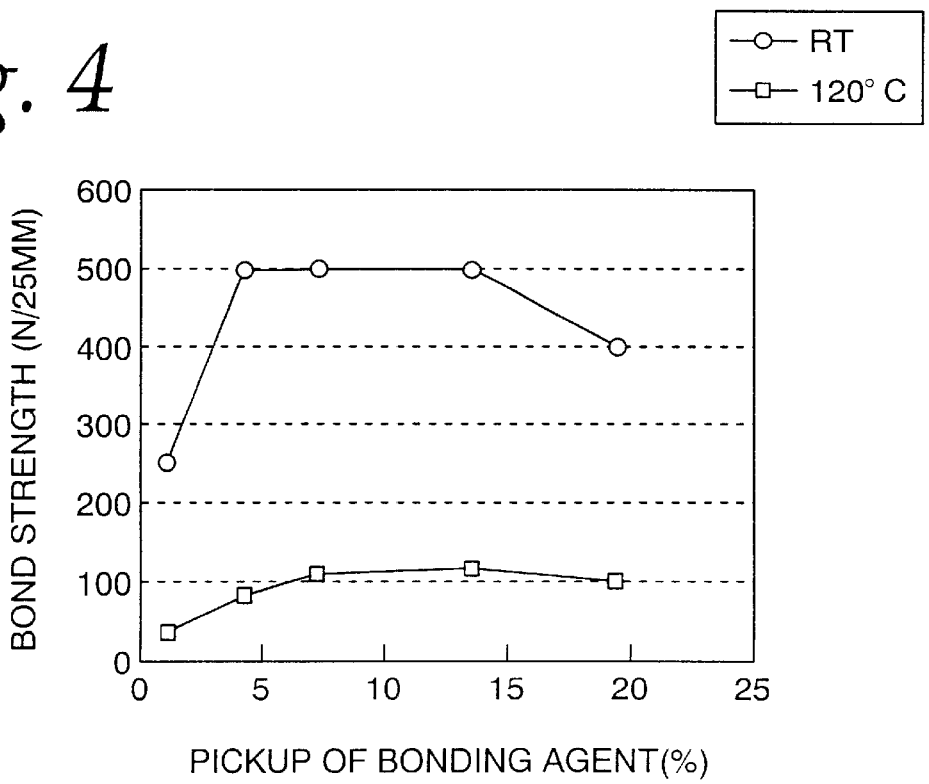
FIG. 4 is a graph showing the relationship between the percentage pickup of bonding agent and bond strength.

A measurement was taken of the per meter weight (W1) of the cord treated up to the third treatment step and thereafter dried, and also of the per meter weight (W2) of the cord treated up to the second treatment step and thereafter dried. The pickup of a bonding agent relative to the cord was expressed by numerical values (%) determined by dividing the pickup weight (W1–W2) by W2. FIG. 4 shows the relationship between the bonding agent pickup and the bond strength.

It can be seen that the third treating solution is effectively bondable when it is formulated with a blend of a bonding rubber and a halogenated polymer. For the best bonding, it is preferred that both the halogenated polymer and the bonding rubber be blended in a ratio of 3:7 to 7:3, as evidenced by the data in FIG. 3.

In the event that the finished cord has a pickup of a bonding agent in an amount less than 3% by weight, with the bonding agent being made up of one or both of the polymer and rubber present in the third treating solution, the cord shows a decline in bond strength, as evidenced by the data in FIG. 4. A pickup of more than 16% by weight results in the cord insufficiently drying during the heat treatment, so that the cords becomes susceptible to picking up residues, as a result of which there is a compromise in the aesthetic appearance thereof. This may also result in overriding and divergence of the cord while spinning during the belt formation process.

The inventive process can be used to facilitate incorporation of fibers into different parts of a power transmission belt and into different types of power transmission belts. The above-described process facilitates bonding of the cords to an ethylene.α-olefin rubber composition so as to make the treated cords suitable as load carrying cords in a power transmission belt.

The foregoing disclosure of specific embodiments is intended to be illustrative of the broad concepts comprehended by the invention.

I claim:

1. A method of bonding an ethylene-α-olefin rubber composition to a fiber cord, the method comprising the steps of:

treating a fiber cord with a first treating solution comprising at least one of an isocyanate compound and an epoxy compound;

after treating the fiber cord with the first treating solution, treating the fiber cord with a second treating solution comprising resorcinol-formalin-rubber latex;

after treating the fiber cord with the second treating solution, treating the fiber cord with a third treating solution comprising a halogenated polymer, a bonding rubber different from the halogenated polymer, and a vulcanizing agent, wherein the halogenated polymer and bonding rubber are present in a ratio of 3:7 to 7:3; and after treating the fiber cord with the third treating solution, vulcanization-bonding an unvulcanized ethylene-α-olefin rubber composition to the fiber cord.

2. The method of bonding an ethylene-α-olefin rubber composition to a fiber cord according to claim 1 wherein the halogenated polymer is a chlorinated rubber.

3. The method of bonding an ethylene-α-olefin rubber composition to a fiber cord according to claim 2 the fiber cord has a solid pickup in the range of 3–16% by weight of the halogenated polymer and the bonding rubber.

4. The method of bonding an ethylene.α-olefin rubber composition to a fiber cord according to claim 2 wherein the bonding rubber comprises an ethylene-α-olefin rubber.

5. The method of bonding an ethylene-α-olefin rubber composition to a fiber cord according to claim 1 wherein the third treating solution comprises the halogenated polymer and bonding rubber in a ratio of about 1:1.

6. The methoding an ethylene.α-olefin rubber composition to a fiber cord according to claim 5 wherein the bonding rubber comprises an ethylene.α-olefin rubber.

7. The method of bonding an ethylen.α-olefin rubber composition to a fiber cord according to claim 5 wherein the bonding rubber comprises at least one of ethylen.α-olefin rubber, NBR, SBR, and ethylen.α-olefin rubber that is at least one of EPDM and EPT.

8. The method of bonding an ethylene.α-olefin rubber composition to a fiber cord according to claim 1 wherein the fiber cord has a solid pickup in the range of 3–16% by weight of the halogenated polymer and the bonding rubber.

9. The method of bonding an ethylene.α-olefin rubber composition to a fiber cord according to claim 1 wherein the unvulcanized ethylene-α-olefin rubber comprises at least one of a) EPDM rubber derived from an ethylene-propylene-diene monomer, and b) EPR rubber.

10. The method of bonding an ethylen.α-olefin rubber composition to a fiber cord according to claim 1 wherein the fiber cord comprises a cord of twisted fiber that comprises at least one of aramid fiber and polyester fiber.

11. The method of bonding an ethylene.α-olefin rubber composition to a fiber cord according to claim 1 wherein the isocyanate compound comprises at least one of 4,4'-diphenylmethane diisocyanate, tolylene 2,4-diisocyanate, polymethylene polyphenyl diisocyanate, hexamethylenediisocyanate, and polyaryl polyisocyanate.

12. The method of bonding an ethylen.α-olefin rubber composition to a fiber cord according to claim 11 wherein the isocyanate compound is mixed with at least one of an organic solvent and an organic solvent that is at least one of toluene and methyl ethyl ketone.

13. The method of bonding an ethylen.α-olefin rubber composition to a fiber cord according to claim 1 including the step of reacting the isocyanate compound with a blocking agent to produce a polyisocyanate with a blocked isocyanate group.

14. The method of bonding an ethylen.α-olefin rubber composition to a fiber cord according to claim 1 wherein the epoxy compound comprises at least one of a) a polyhydric alcohol, b) a product obtained by the reaction of a polyalkylene glycol with a halogen-containing epoxy compound, and c) a product obtained by the reaction of a polyhydric phenol with a halogen-containing epoxy compound.

15. The method of bonding an ethylene.α-olefin rubber composition to a fiber cord according to claim 1 wherein the step of treating a fiber cord with a first treating solution comprises immersing the fiber cord in the first treating solution for 0.5–30 seconds and then drying the fiber cord for 2–5 minutes at 150–190° C.

16. The method of bonding an ethylene.α-olefin rubber composition to a fiber cord according to claim 1 wherein the resorcinol-formalin-rubber latex of the second solution comprises a mixture of resorcinol-formalin polycondensate and a rubber latex, with the resorcinol to formalin molar ratio being in the range of 3:1 to 1:3.

17. The method of bonding an ethylen.α-olefin rubber composition to a fiber cord according to claim 16 wherein the rubber latex comprises at least one of an aicrylonitrile-butadiene rubber latex (NBR latex) and a hydrogenated acrylonitrile-butadiene rubber latex (H-NBR latex).

18. The method of bonding an ethylene.α-olefin rubber composition to a fiber cord according to claim 17 wherein the resorcinol-formalin polycondensate has a resin content of 5–100 parts by weight per 100 parts by weight of rubber latex, with the total solid content of the resorcinol-formalin-polycondensate being between 5–40%.

19. The method of bonding an ethylen.α-olefin rubber composition to a fiber cord according to claim 1 wherein the step of treating the fiber cord with a second treating solution comprises immersing the fiber cord in the second treating solution at a temperature of 5–40° C. for 0.5–30 seconds, and then drying the fiber cord for 1–3 minutes at 200–250° C.

20. The method of bonding an ethylene.α-olefin rubber composition to a fiber cord according to claim 1 wherein the halogenated polymer of the third treating solution comprises at least one of chlorinated rubber, chloroprene rubber, and chlorosulfonated polyethylene rubber.

21. The method of bonding an ethylene.α-olefin rubber composition to a fiber cord according to claim 1 wherein the vulcanizing agent comprises at least one of dibenzothiazil disulfide (MBTS), tetramethylthiuram disulfide (TMTD), N-cyclohexyl-2-benzothiazil sulfenamide (CBS), tetramethylthiuram monosulfide (TMTM), mercaptobenzothiazole (MBT), PZ (ZnMDC), and sulfur.

22. A method of bonding an ethylene-α-olefin rubber composition to a fiber cord, said method comprising the steps of:
   treating a fiber cord with a first treating solution comprising at least one of an isocyanate compound and an epoxy compound;
   after treating the fiber cord with the first treating solution, treating the fiber cord with a second treating solution comprising resorcinol-formalin-rubber latex, with the resorcinol-formalin-rubber latex comprising at least an acrylonitrile-butadiene rubber latex;
   after treating the fiber cord with the second treating solution, treating the fiber cord with a third treating solution comprising a chlorinated rubber, an ethylene-α-olefin rubber, and a vulcanizing agent, with the ratio of chlorinated rubber to ethylene-α-olefin rubber being 3:7 to 7:3, and so that the fiber cord has a solid pickup in the range of 3–16% by weight of the chlorinated rubber and the ethylene-α-olefin rubber; and
   after treating the fiber cord with the third treating solution, vulcanization-bonding an unvulcanized ethylene-α-olefin rubber composition to the fiber cord.

23. A fiber cord-rubber laminate made according to the process of any one of claims 1–22.

24. The method of bonding an ethylene-α-olefin rubber composition to a fiber cord according to claim 1 wherein after vulcanization bonding of the unvulcanized ethylene-α-olefin rubber composition to the fiber cord, the resulting fiber cord-rubber laminate is incorporated into a transmission belt.

25. A fiber cord-rubber laminate made according to the method of claim 1 having a room temperature bonding strength of at least 150 N/25 mm.

26. A fiber cord-rubber laminate made according to the method of claim 1 having a 120° C. bonding strength of 10–120 N/25 mm.

27. A method of bonding an ethylene-α-olefin rubber composition to a fiber cord, the method comprising the steps of:
   treating a fiber cord with a first treating solution comprising at least one of an isocyanate compound and an epoxy compound;
   after treating the fiber cord with the first treating solution, treating the fiber cord with a second treating solution comprising resorcinol-formalin-rubber latex;
   after treating the fiber cord with the second treating solution, treating the fiber cord with a third treating solution comprising a halogenated polymer, a bonding rubber different from the halogenated polymer, and a vulcanizing agent, wherein the halogenated polymer and bonding rubber are present in a ratio of 3:7 to 7:3; and
   after treating the fiber cord with the third treating solution, vulcanization-bonding an unvulcanized ethylene-α-olefin rubber composition to the fiber cord,
   wherein the treated fiber cord is bonded to the rubber at a bonding strength of at least 250 N/25 mm at room temperature.

28. A method of manufacturing an automotive belt involving the bonding an ethylene-α-olefin rubber composition to a fiber cord, the method comprising the steps of:

treating a fiber cord with a first treating solution comprising at least one an isocyanate compound and an epoxy compound;

after treating the fiber cord with the first treating solution, treating the fiber cord with a second treating solution comprising resorcinol-formalin-rubber latex;

after treating the fiber cord with the second treating solution, the fiber cord with a third treating solution comprising a halogenated polymer, a bonding rubber different from the halogenated polymer, and a vulcanizing agent, wherein the halogenated polymer and bonding rubber are present in a ratio of 3:7 to 7:3;

after treating the fiber cord with the third treating solution, vulcanization-bonding an unvulcanized ethylene-α-olefin rubber composition to the fider cored; and after vulcantzation bonding of the unvulcanized ethylene-α-olefin rubber composition to the fiber cord, the resulting the fider cord-rubber laminate is incorporated into a transmission belt.

* * * * *